(12) United States Patent
Ito et al.

(10) Patent No.: US 6,292,993 B1
(45) Date of Patent: Sep. 25, 2001

(54) VULCANIZING MACHINE WITH SEGMENTED MOLD

(75) Inventors: Taizo Ito; Tomotaka Goto; Masami Nagata, all of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/294,049

(22) Filed: Apr. 19, 1999

(30) Foreign Application Priority Data

| Apr. 17, 1998 | (JP) | 10-124137 |
|---|---|---|
| Apr. 17, 1998 | (JP) | 10-124138 |
| May 21, 1998 | (JP) | 10-156756 |

(51) Int. Cl.$^7$ ................................ B29C 35/02
(52) U.S. Cl. .................. 29/426.1; 29/428; 425/46; 425/47; 425/195
(58) Field of Search ................ 425/46, 47, 195; 29/426.1, 428, 469

(56) References Cited

U.S. PATENT DOCUMENTS

| 4,580,959 | 4/1986 | Pizzorno et al. |
| 4,872,822 | 10/1989 | Pizzorno. |
| 4,883,415 | 11/1989 | Salvadori. |
| 5,118,269 | * 6/1992 | Klose et al. ............... 425/47 |
| 5,234,326 | * 8/1993 | Galli et al. ............... 425/47 |

FOREIGN PATENT DOCUMENTS

| 24 20 404 A1 | 11/1975 | (DE). |
| 324 00 591 A1 | 7/1985 | (DE). |
| 0 701 894 A2 | 3/1996 | (EP). |
| 1 248 891 | 10/1971 | (GB). |

* cited by examiner

*Primary Examiner*—James P. Mackey
(74) *Attorney, Agent, or Firm*—Oliff & Berridge, PLC.

(57) ABSTRACT

A vulcanizing machine for producing pneumatic tires includes an exchangeable segmented mold comprised of tread mold pieces for defining the outer contour of a tire tread portion, and upper and lower side mold members engaged with the tread mold pieces, for defining the outer contours of the sidewall portions. The tread mold pieces are detachably connected to connector segments which are slidably engaged with a container ring so that vertical movement of the container ring causes radial movement of the connector segments relative to the tread mold pieces. After production of tires of a predetermined size has been completed, the mold is removed from the machine by moving the container ring upwards to disconnect the connector segments from the tread mold pieces, and disconnecting the upper side mold member from a top plate of the machine. Another segmented mold for tires of a different size is incorporated into the machine, by placing and centering the mold relative to the machine, moving the container ring downwards to connect the connector segments to the tread mold pieces, and connecting the top plate to the upper side mold member. The mold can be efficiently exchanged with respect to the machine under a high temperature condition, thereby improving the manufacturing productivity of tires.

10 Claims, 10 Drawing Sheets

VULCANIZING MACHINE WITH SEGMENTED MOLD

BACKGROUND OF THE INVENTION

1. Field of the Invention

The present invention relates to a vulcanizing machine for manufacturing pneumatic tires and, in particular, to a vulcanizing machine that is provided with an exchangeable segmented mold for selectively producing tires of different sizes or specifications.

2. Description of the Related Art

In the tire industry, it is a recent trend to use vulcanizing machines with segmented molds for manufacturing pneumatic tires, in particular high performance radial tires. Typically, a segmented mold includes a plurality of tread mold pieces for defining the outer contour of a tire tread portion, and upper and lower side mold members engaged with the tread mold pieces, for defining the outer contours of tire sidewall portions. The tread mold pieces are detachably connected to respective connector segments which are slidably engaged with a container ring so that vertical movement of the container ring causes radial movement of the connector segments relative to the tread mold pieces. Such segmented mold is disclosed, for example, in U.S. Pat. Nos. 4,872,822 and 4,883,415.

In order to achieve a satisfactory manufacturing productivity of tires, however, known vulcanizing machine requires further improvement. Specifically, besides a complicated structure arising from a large number of associated components and a high initial cost, there is a serious a problem that substantial labor and time are required for manually assembling or disassembling the segmented mold when, for example, changeover is to be effected in respect of size or specification of tires to be manufactured. Moreover, because the assembly or disassembly of the segmented mold is manually carried out within the vulcanizing machine, it is often necessary to wait the required operations until the vulcanizing machine has been sufficiently cooled down, which involves considerable loss time and waste of the heat energy which had been supplied to the vulcanizing machine and used for previous vulcanizing steps.

DISCLOSURE OF THE INVENTION

It is therefore an object of the present invention to eliminate the above-mentioned problems of the conventional vulcanizing machine.

It is another object of the present invention to provide an improved vulcanizing machine with an exchangeable segmented mold which can be installed into the machine or removed therefrom in a facilitated manner.

It is still another object of the present invention is provide an improved method for exchanging a segmented mold of a vulcanizing machine, wherein the segmented mold can be installed into the machine or removed therefrom within a significantly reduced time, thereby making it possible to readily perform the changeover in size or specification of the tires to be produced by the vulcanizing machine and thereby achieving a marked improvement in the manufacturing productivity.

According to one aspect of the present invention, there is provided a method of exchanging a segmented mold of a vulcanizing machine for producing pneumatic tires, wherein the segmented mold is of a type which comprises a plurality of tread mold pieces for defining an outer contour of a tire tread portion, said tread mold pieces each having an outer peripheral surface, and upper and lower side mold members engaged with said tread mold pieces, for defining respective tire sidewall portions, and wherein said vulcanizing machine further comprises a plurality of connector segments detachably connected to said outer peripheral surfaces of the respective tread mold pieces, said connector segments each having a tapered portion on back sides thereof, a container ring having a tapered surface which is slidably engaged with said tapered portions of the connector segments such that an axial movement of the container ring in the axial direction of the vulcanizing machine causes a radial movement of said connector segments relative to said tread mold pieces, and a top plate detachably connected to said upper side mold member.

The method according to the present invention comprises the step of removing a first segmented mold for tires of a first size, which is comprised of first tread mold pieces, a first upper side mold member and a first lower side mold member, from the vulcanizing machine in its non-operative condition, after disconnecting the connector segments from the respective first tread mold pieces while moving the container ring upwards such that the connector segments are moved radially outwards and disconnected from the respective first tread mold pieces, and disconnecting the top plate from the first upper side mold member.

The method according to the present invention further comprises the step of installing a second segmented mold for tires of a second size, which is comprised of second tread mold pieces, a second upper side mold member and a second lower side mold member, onto the vulcanizing machine, after placing the second mold into the vulcanizing machine, centering the second mold with reference to said vulcanizing machine, moving the container ring downwards such that the connector segments are moved radially inwards relative to the second tread mold pieces and are connected to the respective second tread mold pieces, and connecting the top plate to the second upper side mold member.

According to another aspect of the present invention, there is provided a vulcanizing machine for producing pneumatic tires, comprising: upper and lower holders; upper and lower side mold members for defining respective the sidewall portions, said upper side mold member being detachably connected to said upper holder through a top plate, and said lower side mold member being detachably connected to said lower holder; a plurality of tread mold pieces for defining an outer contour of a tire tread portion, said tread mold pieces each having an outer peripheral surface and being engaged with said upper and lower side mold members; a plurality of connector segments detachably connected to said outer peripheral surfaces of the respective tread mold pieces, said connector segments each having a tapered portion on back sides thereof; a container ring having a tapered surface which is slidably engaged with said tapered portions of the connector segments such that an axial movement of the container ring causes a radial movement of said tread mold pieces; clamp means for detachably connecting said upper side mold member to said top plate; and actuator means for moving said upper holder toward and away from said upper side mold member together with said top plate connected thereto.

BRIEF DESCRIPTION OF THE DRAWINGS

The present invention will be more fully described below with reference to preferred embodiments shown in the accompanying drawings, in which.

DETAILED DESCRIPTION OF THE PREFERRED EMBODIMENTS

Figure 1:
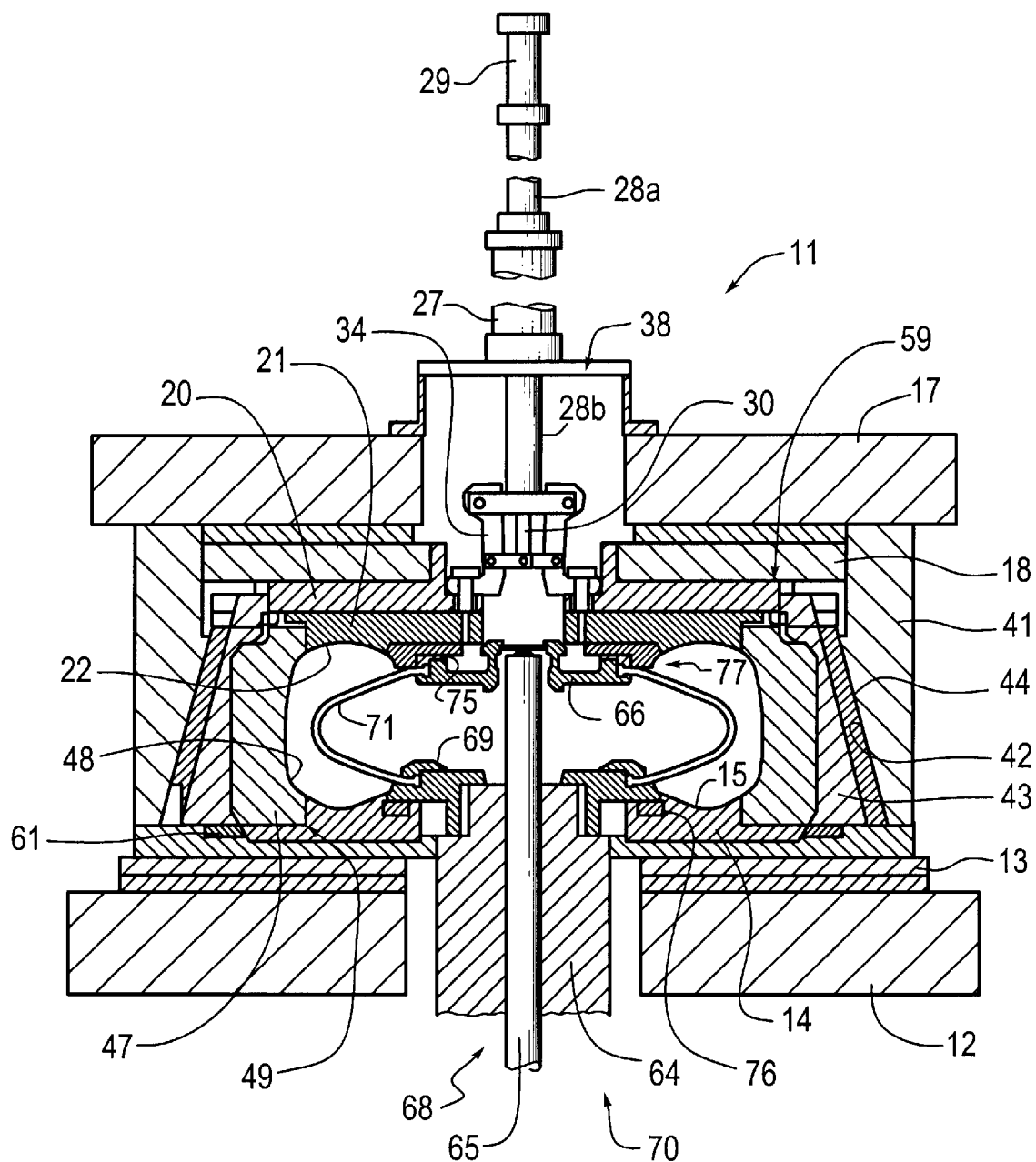
FIG. 1 is a sectional view showing the vulcanizing machine according to one embodiment of the present invention.

Referring now to FIG. 1, reference numeral 11 denotes a vulcanizing machine according to the present invention, which includes a lower holder 12 fixedly attached to a stationary base frame (not shown). The lower holder 12 has a lower heating platen 13. A lower side mold member 14 is mounted on the lower holder 12 and has an inner surface 15 on its upper side, which serves to form the outer contour of a sidewall portion of an unvulcanized tire. The vulcanizing machine 11 further includes an upper holder 17 which is spaced from, and disposed above the lower holder 12. The upper holder 17 has an upper heating platen 18 as is the case with the lower holder 12. The upper holder 17 is connected to a piston rod of a vertical cylinder device 27 so that the upper holder 17 can be lifted or lowered by the cylinder device 27 with reference to the lower holder 12.

Figure 2:
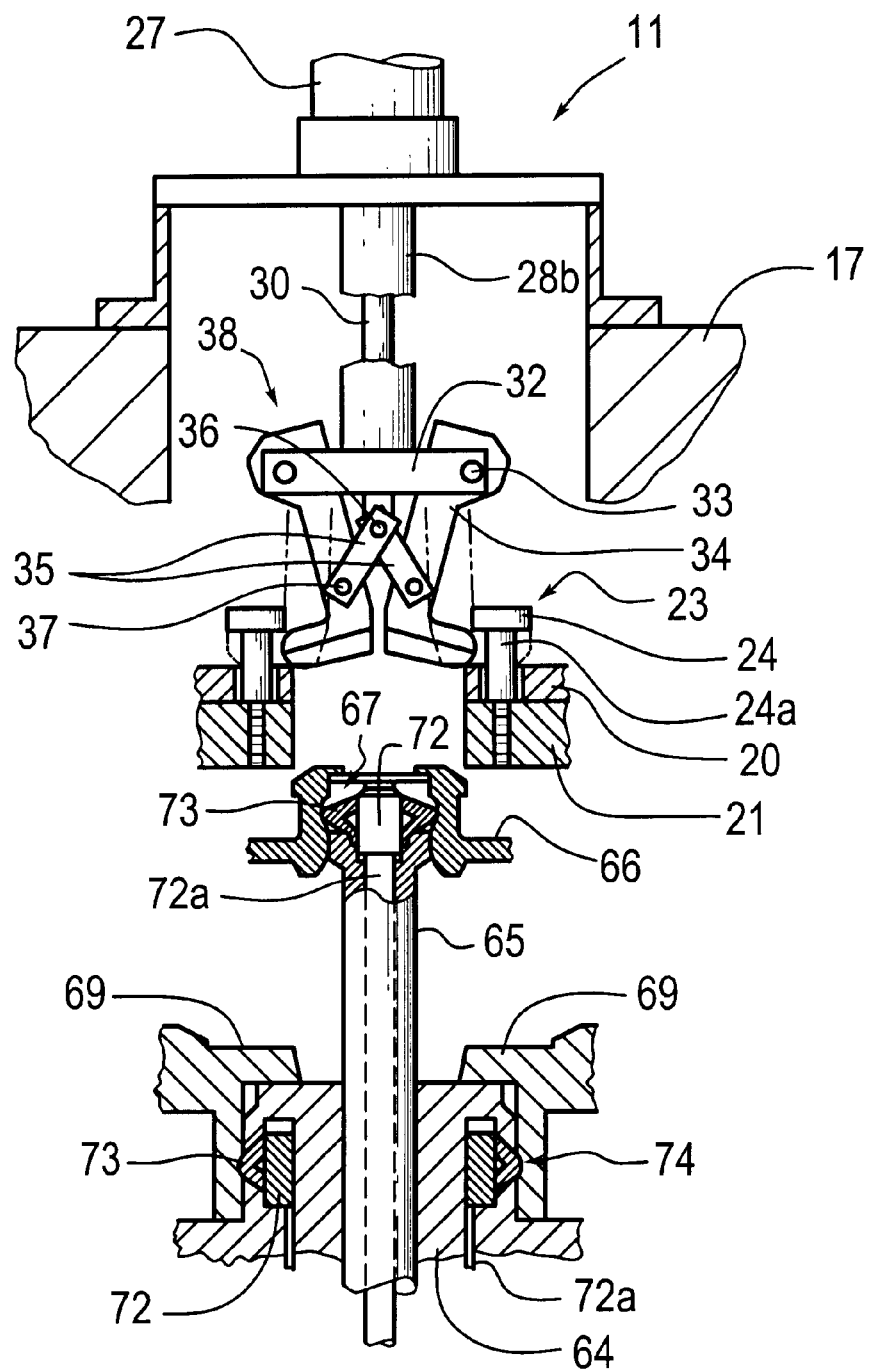
FIG. 2 is a sectional view showing the detailed arrangement of the clamp device.

Referring also to FIG. 2, a horizontal top plate 20 is arranged immediately below the upper holder 17. An upper side mold member 21 is arranged immediately below the top plate 20 and has an inner surface 22 on its lower side which serves to define the outer contour of another sidewall portion of the tire. A plurality of lock pins 23 are arranged at regular intervals 21 in the circumferential direction, along the inner periphery of the upper side mold member 21. The lock pins 23 are threadedly connected to the upper side mold member 21 so as to extend vertically upwards. Each lock pin 23 at its top end has a head 24 with an increased diameter, which defines a shoulder 24a on its bottom surface. The arrangement of the lock pins 23 is such that when the top plate 20 and the upper side mold member 21 are in contact with each other, the lock pins 23 extend through the top plate 20 with the head 24 of each lock pin 23 protruding beyond the top plate 20 to define a gap between the shoulder 24a and the upper surface of the top plate 20.

A main cylinder device 27 is attached to the center portion of the upper holder 17 and oriented in the vertical direction. The main cylinder device 27 is of a double-rod type, having an upper piston rod 28a and a lower piston rod 28b which extend vertically upwards and downwards, respectively. The upper piston rod 28a of the main cylinder device 27 has a top end to which an auxiliary cylinder device 29 is attached in coaxial manner. The auxiliary cylinder device 29 has a piston rod 30 which extends through inside of the upper and lower piston rods 28a, 28b of the main cylinder device 27, to protrude downwards from the bottom end of the lower piston rod 28b. A bracket 32 is fixedly secured to the bottom end of the lower piston rod 28b. A plurality of angle-shaped clamp levers 34 are pivotally supported on the bracket 32 through pins 33 at their top end portions. The clamp levers 34 are operatively connected to the piston rod 30 of the auxiliary cylinder device 29 through respective link elements 35. Thus, each link elements 35 has a radially inner end which is pivotally connected to the bottom end of the piston rod 30 through a pin 36, and a radially outer end which is pivotally connected to the center portion of the clamp lever 34 through a pin 37. When the piston rod 30 of the auxiliary cylinder device 29 is moved downwards, the link elements 35 gradually swing so that their bottom ends pivotally connected to the clamp levers 34 are spread radially outwards. This causes the bottom end portions of the clamp levers 34 to be spread radially outwards and thereby pushed into the gap between the upper surface of the top plate 20 and the bottom surface of the shoulders 24a of the lock pins 23. The clamp levers 34, the auxiliary cylinder device 29, as well as the components associated therewith constitute, as a whole, a single clamp device 38 which is disposed between the main cylinder device 27 on one hand, and the top plate 20 and the upper side mold member 21 on the other hand. The clamp device 38 serves to collectively clamp the top plate 20 and the upper side mold members 21 at their center portions, with the top plate 20 urged against the upper side mold member 21, so that the top plate 20 and the upper side mold member 21 are detachably connected to the main cylinder device 27 through the clamp device 38. Moreover, when the main cylinder device 27 is operated to move the clamp device 38 vertically upwards or downwards, the motion of the clamp device 38 is transmitted to the top plate 20 and the upper side mold member 21 so that they are collectively moved vertically upwards or downwards relative to the upper holder member 17, while being collectively clamped by the clamp device 38.

Figure 3:
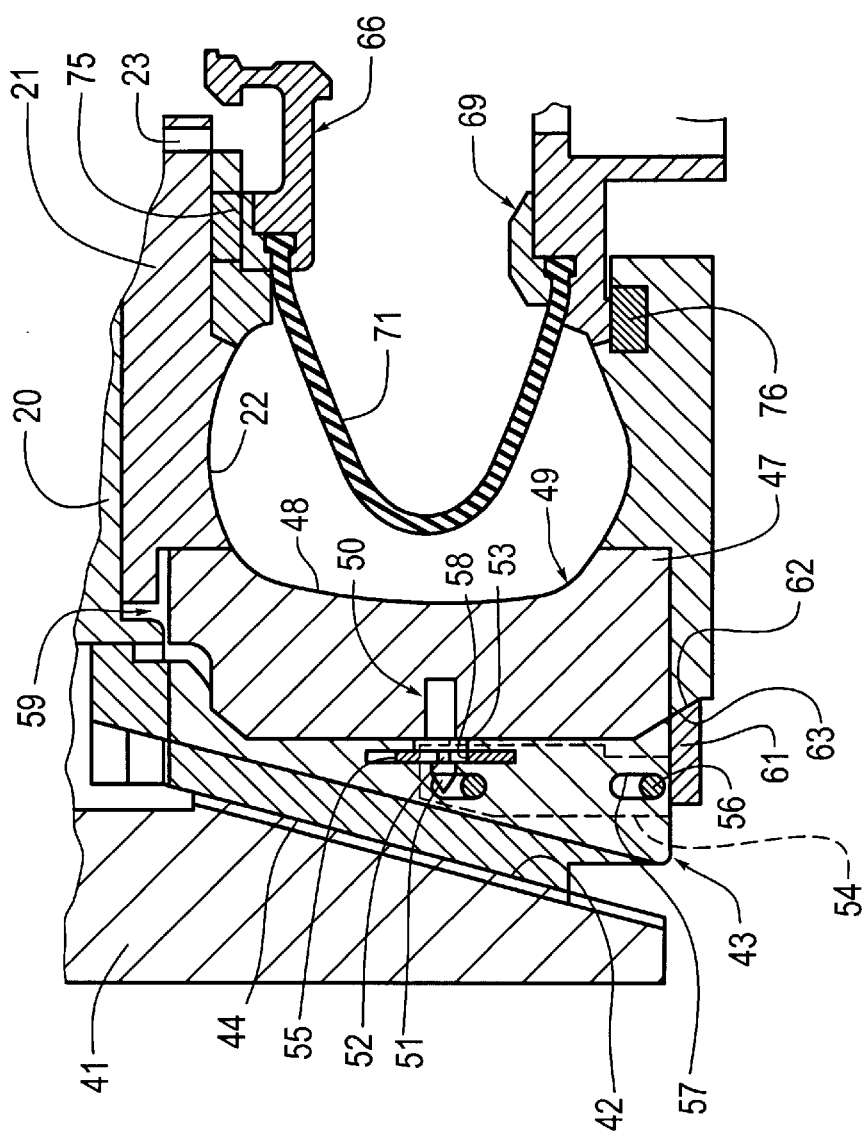
FIG. 3 is a sectional view showing the detailed arrangement of the segmented mold.

With reference to FIGS. 1 and 3, the vulcanizing machine includes a container ring 41 which surrounds the top plate 20 and the upper side mold member 21 from radially outer side. The container ring 41 has an upper end which is attached to the outer peripheral portion of the upper holder 17, and an inner peripheral surface which is at least partly formed of an inclined surface 42. The inclined surface 42 has an inner diameter which increased toward the lower holder 12. There are arranged, on radially inner side of the container ring 41, a plurality of arcuate connector segments 43, e.g., nine in number, which are spaced from one another in the circumferential direction. Each connector segment 43 has an upper end which is supported, movably in the radial direction, by the outer peripheral portion of the top plate 20 which is situated on radially outer side of the upper side mold member 21. Each connector segment 43 has an outer peripheral surface formed as an inclined surface 44 which is identical in inclination with the inclined surface 42 of the container ring 41. The inclined surface 44 of the connector segment 43 and the inclined surface 42 of the container wing are connected to and slidably engaged with each other through a dovetail joint. Thus, when the top plate 20 is moved toward and away from the upper holder 17, thereby changing the distance therebetween, the connector segments 43 are supported on the top plate 20 while being synchronously moved in the radial direction due to the wedge function of the inclined surfaces 42, 44.

A plurality of tread mold pieces 47, which are identical in number with the connector segments 43, are arranged on the radially inner side of the respective connector segments 43. Each tread mold piece 47 has an inner surface 48 for partly defining the tread portion of the unvulcanized tire. The tread mold pieces 47 are assembled into an annular arrangement and constitute, together with the upper and lower side mold members 21 and 14, a segmented mold 49. Each tread mold piece 47 has an outer peripheral surface to which lock pins 50 are threadedly connected to project radially outwards. Each lock pin 50 has a conical head 51 which is tapered toward its free end, and a shaft portion 52 having a diameter which is smaller than the maximum diameter of the head 51. Thus, a shoulder portion 53 is formed between the head 51 and the shaft 52, i.e., at the radially inner end surface of the head 51. A pair of slide plates 54 are slidably engaged with the circumferential end surfaces of the connector segment 43. A latch element 55 is contained in each of the connector segments 43 so that it can be moved in the vertical direction, and has its both ends which are connected to the slide plates 54 on the circumferential end surfaces of the connector segment 43. Guide pins 56 are connected to each slide plate 54 and slidably received in respective vertical slots 57 which are formed in the connector segment 43 for guiding the vertical movement of the slide plate 54. Each latch element 55 has a center portion formed with a recess 58 which can be engaged with the lock pin 50.

More particularly, when the connector segments 43 are moved radially inward, i.e., toward the respective tread mold pieces 47, the lock pins 50 are passed through radial openings in the connector segments 43 and engaged with the recess 58 of the latch element 55. On this occasion, the conical head 51 temporarily pushes the latch element 55 upwards until the maximum diameter portion of the conical head 51 reaches the latch element 55. As soon as the connector segment 43 comes in contact with the corresponding tread mold piece 47 and the head 51 passes through the recess 58 of the latch element 55, the latch element 55 is released from the head 51 and moved downwards into abutment against the shaft 52, by its own weight or biasing force of appropriate resilient means, not shown. Thus, the latch element 55 is engaged with the shoulder portion 53 of the lock pin 50, and prevents the lock pin 50 from being removed from the connector segment 43. On the other hand, the lock pin 50 can be disengaged from latch element 55 when the latch element 55 is moved upwards relative to the lock pin 50. In this manner, the tread mold pieces 47 can be detachably connected to the respective connector segment 43 by the lock pins 50 and the corresponding latch elements 55.

The upper side mold member 21 and the tread mold pieces 47 constitute, as a whole, a sub-assembly 59 which is detachably connected to the upper holder 17 through the main cylinder device 27, the clamp device 38, the container ring 41 and the connector segments 43. Also, when the tread mold pieces 47 are moved to the radially innermost position together with the connector segments 43, the tread mold pieces are closely in contact with each other into the shape of a continuous ring. On this occasion, the tread mold pieces 47 are closely in contact with the lower holder 12 and the lower side mold member 14 so as to define a substantially toroidal inner space for containing an unvulcanized tire therein. Then, the inner surfaces 22, 15, 48 of the upper and lower side mold members 21, 14 and tread mold pieces 47 form a continuous inner surface for defining the outer contour of the tire.

Three or more plate-like support elements 61 are secured to the lower end portions of the connector segments 43, and arranged so that they are spaced from one another at regular intervals in the circumferential direction. Each support element 61 has a radially inner end portion which protrudes radially inwards beyond the connector segments 43, and which is formed as an inclined surface 62 so that it is inclined downwards and radially inwards. Similarly, the radially outer end portion of the lower side mold member 14 is formed as an inclined surface 63 which is inclined at the same angle as the inclined surface 63. Thus, when the connector segment 43 is moved to the radially innermost position, the inclined surface 62 of the support element 61 is brought into a surface-contact with the inclined surface 63 of the lower side mold member 14. Under such surface-contact between the inclined surfaces 62, 63, the upper and the lower side mold member 21, 14 and the tread mold pieces 47 are held by the upper holder 17 through the support elements, 61 the connector segments 43, and the container ring 41. Thus, when the upper holder 17 is moved vertically upwards, the lower and the upper side mold member 21, 14 and the tread mold pieces 47 are collectively moved upwards while being supported by the support elements 61.

With reference to FIGS. 1, 2, and 3, a substantially cylindrical support column 64 extends in the vertical direction and is passed through the center opening in the lower holder 12. The support column 64 can be lifted or lowered by a cylinder device, not shown, and serves to slidably support a center post 65 which extends in the vertical direction through the column 64. The center post 65 can be moved in the vertical direction by another cylinder device, not shown, relative to the column 64.

An upper clamp ring 66 is detachably connected to the upper end portion of the center post 65 through a lock mechanism 67. The lock mechanism 67 includes a displacer member 72 which is connected to the upper end of a connecting rod 72a. The connecting rod 72a extends through the center post 65, and has its lower end connected to an auxiliary cylinder device, not shown, so that the connecting rod 72a can be moved in the vertical direction relative to the center post 65. When the auxiliary cylinder device is actuated to move the connecting rod 72a in the vertical direction relative to the center post 65, the displacer member 72 causes one or more engaging pieces 73 to be moved in the radial direction so that the upper clamp ring 66 is locked with, or unlocked from the center post 65. Incidentally, the upper clamp ring 66 is located between the upper and lower side mold member 21, 14, and is brought into abutment against the inner periphery of the upper side mold member 21 when the center post 65 is lifted. The center post 65 and the associated cylinder device constitute, as a whole, a vertical drive means 68 for lifting or lowering the upper clamp ring 66.

A lower clamp ring 69 is detachably connected to the upper end portion of the support column 64 through another lock mechanism 74. The lower clamp ring 69 is located between the upper and the lower side mold member 21, 14, and is brought into abutment against the inner periphery of the lower side mold member 14 when the support column 64 is lowered, thereby causing the lower side mold member 14 to be pushed against, and detachably connected to the lower holder 12. The lock mechanism 74 has essentially the same construction as the lock mechanism 67, and is thus constructed by a connecting rod 72a and a displacer element 72, which are moved in the vertical direction by an auxiliary cylinder device, not shown, as well as one or more engaging pieces 73 which can be moved in the radial direction as the displacer element 72 is moved in the vertical direction. The support column 64 and the associated cylinder device constitute, as a whole, a vertical drive means 70 for lifting or lowering the lower clamp ring 69 independently from the upper clamp ring 66.

The upper and lower clamp rings 66, 69 are engageable with the inner peripheries of a bladder 71 on the upper and lower sides, respectively. Thus, the upper clamp ring 66 tightly clamps the inner periphery of the bladder 71 on the upper side. Similarly, the lower clamp ring 69 tightly clamps the inner periphery of the bladder 71 on the lower side. The bladder 71 is comprised of a flexible material and used during the vulcanization of unvulcanized tire in conventional manner. Thus, when a heat medium under predetermined temperature and pressure conditions is introduced into the bladder 71, the bladder 71 is cased to expand inside the unvulcanized tire thereby to to urge the outer surfaces of the tire against the inner surfaces of the upper and lower side mold members 21, 14 and the tread mold pieces 47 during vulcanization, in order to define the desired outer contour of the product tire.

An annular magnet 75 is attached to, or embedded in the upper side mold member 21 adjacent to its inner periphery and opposed to the upper clamp ring 66. Similarly, another annular magnet 76 is attached to, or embedded in the lower side mold member 14 adjacent to its inner periphery and opposed to the lower clamp ring 69. The magnets 75, 76 may each comprise a permanent magnet which is simple in structure and easy to produce. The magnets 75, 76 serve to hold the inner peripheries of the bladder 71 on the upper and lower sides in place, when the sub-assembly 59 of the upper side mold member 21 and the tread mold pieces 17 is to be removed from, or installed into the vulcanizing machine 11 together with the lower side mold member 14.

More particularly, the attraction force of the magnet 75 causes the upper clamp ring 66 to be attracted to, and held in contact with the upper side mold member 21, after the upper clamp ring 66 has been unlocked and removed from the center post 65. Similarly, the attraction force of the magnet 76 causes the lower clamp ring 69 to be attracted to, and held in contact with the lower side mold member 14, after the lower clamp ring 69 has been unlocked and removed from the support column 64.

The magnets 75, 76 constitute, as a whole, a dislocation preventing means 77 for preventing the relative dislocation between the upper and lower clamp rings 66, 69 during the exchange of the segmented mold of the vulcanizing machine 11, wherein the upper and lower side mold members 21, 14 and the tread mold pieces 74 are removed from, or installed into the vulcanizing machine 11, with the clamp rings 66, 69 removed from the support columns 64 and the center post 65, respectively.

The operation of the vulcanizing machine 11 according to the above-mentioned embodiment will be explained below.

When an unvulcanized tire is to be subjected to vulcanization with the vulcanizing machine 11 explained above, the tire with a laid-down posture is carried into the vulcanizing machine 11, fitted over the outer side of the bladder 71 in its non-operative, substantially cylindrical state, and the sidewall portion of the tire on its lower side is brought into contact with the inner surface 15 of the lower side mold member 14. A low pressure fluid is then supplied into the bladder 71 while removing the upper clamp ring 66 and the center post 65 vertically downwards, so that the bladder 71 is caused to inflate into a toroidal shape and enters into the inner space of the tire. On this occasion, the lower piston rod 28b of the cylinder device 27 protrudes downwards. Therefore, the top plate 20 and the upper side mold member 21 are spaced from the upper holder 17 by a predetermined distance. The connector segments 43 and the tread mold pieces 47 are moved along the inclined surface 42 of the container ring 41 downwards and radially outwards, and then stopped in a state in which they are suspended from the lower end portion of the container ring 41. Furthermore, the latch elements 55 are engaged with the shoulders 53 of the lock pins 50 which have been inserted into the connector segments 43. As a result, the connector segments 43 are firmly connected or locked to the respective tread mold pieces 47.

Subsequently, the upper holder 17, the container ring 41, the top plate 20, the upper side mold member 21, the connector segments 43 and the tread mold pieces 47 are collectively moved downwards. The upper side mold member 21 is thus moved toward the tire and the lower side mold member 14. As soon as the upper side mold member 21 reaches the lowermost position and abuts with the upper clamp ring 66, the downward movement of the top plate 20, the upper side mold member 21, the connector segments 43 and the tread mold pieces 47 is forcedly stopped by the upper clamp ring 66. In this instance, the inner surface 22 of the upper side mold member 21 is in contact with the sidewall portion of the tire on its upper side, and the bottom surfaces of the tread mold pieces 47 are in contact with the upper surface of the lower holder 12.

Although the top plate 20, the upper side mold member 21, the connector segments 43 and the tread mold pieces 47 are stopped after the downward movement as mentioned above, the upper holder 17 is further moved downwards, i.e., toward the top plate 20 and the upper side mold member 21. Synchronously with the continued downward movement of the upper holder 17, the lower piston rod 28b of the cylinder device 27 is retracted upwards so as to decrease the distance between the upper holder 20 on one hand, and the top plate 20 and the upper side mold member 21, on the other hand. As a result, the tread mold pieces 47 and the connector segments 43, which are supported by the top plate 20, are synchronously pushed radially inwards, i.e., toward the tire, due to the relative sliding movement between the inclined surfaces 42, 44 of the container ring 41 and the connector segments 43. The downward movement of the upper holder 17 is stopped as soon as its lowermost position is reached. The tread mold pieces 47 are then at their radially innermost positions, and in tight contact with each other and also with the upper and lower side mold member 21, 14, thereby tightly closing the segmented mold. Thus, a heat medium under high temperature and high pressure conditions is supplied into the bladder 71 so that the tire is subjected to vulcanization and the outer shape of the tire is formed by the inner surfaces 22, 15, 48 of the upper and the lower side mold member 21, 14 and the tread mold pieces 47.

When vulcanization of the tire has been completed, the upper holder 17 is moved upwards. On this occasion, the lower piston rod 28b of the cylinder device 27 is extended downwards so that the top plate 20 and the upper side mold member 21 are maintained at their positions for vulcanization. As a result, the connector segments 43 and the tread mold pieces 47 are synchronously moved radially outwards due to the relative sliding movement between the inclined surfaces 42, 44 of the container ring 41 and the connector segments 43. Although the container ring 41 is moved upwards together with the upper holder 17, the top plate 20 supporting the connector segments 43 is maintained at its position for vulcanization as mentioned above. Thus, the connector segments 43 and the tread mold pieces 47 undergo a sliding movement relative to the container ring 41 along the inclined surfaces 42, 44. The relative sliding movement of the connector segments 43 is stopped by the container ring 41 as soon as their lowermost positions are reached, when the lower piston rod 28b of the cylinder device 27 has been fully extended, and the upward movement of the upper holder 17 is further continued. Therefore, the connector segments 43 and the tread mold pieces 47 are moved upwards together with the top plate 20 and the upper side mold member 21, as being suspended from the lower end portion of the container ring 41. The center post 65 is then moved upwards to deform the vulcanizing bladder 71 into a substantially cylindrical shape so that the product tire subjected to vulcanization can be removed from the vulcanizing machine 11 by a movable carriage, not shown, to complete a vulcanizing cycle of the machine 11. This cycle is repeated until a required number of tires with the same size or specification have been produced.

When tires of different size or specification is to be produced by the same vulcanizing machine 11, it is necessary to exchange the segmented mold 49 of the vulcanizing machine 11, i.e., the upper and lower side mold member 21, 14 and the tread mold pieces 47, together with the associated components.

1. Removal of Previous Segmented Mold

To this end, an initial stage is to remove the previous segmented mold 49 from the vulcanizing machine 11, which had been used for production of tires of the previous size or specification. Thus, with the segmented mold 49 maintained opened after completion of vulcanization of tires of the previous size or specification, the center post 65 and the upper clamp ring 66 are moved downwards to their predetermined positions and the upper holder 17 is also moved downwards, i.e., toward the lower holder 12, as is the case with the of starting of the above-mentioned vulcanization process. Thus, the top plate 20, the upper side mold member 21 and the container ring 41, which are collectively clamped by the clamp device 38, are moved downwards, i.e., toward the lower side mold member 14.

When the upper side mold member 21 reaches the lowermost position and comes into abutment with the upper clamp ring 66, the lower surfaces of the tread mold pieces 47 are in abutment with the upper surface of the lower holder 12. However, the downward movement of the upper holder 17 and the container ring 41 is continued. Following this downward movement of the upper holder 17, the lower piston rod 28b of the cylinder device 27 is retracted so that the top plate 20 and the upper side mold member 21 are moved upwards, i.e., toward the upper holder 17. Thus, the tread mold pieces 47 and the connector segments 43 are synchronously pushed radially inwards, due to the sliding engagement between the inclined surfaces 42, 44 of the container ring 41 and the connector segments 43.

When the radially innermost positions the connector segments 43 and the tread mold pieces 47 have been reached, the tread mold pieces 47 are in tight contact. with each other and also with the upper and lower side mold member 21, 14, so that the upper and the lower side mold member 21, 14 and the tread mold pieces 47 are assembled with each other as a segmented mold 49. The support elements 62 are then moved radially inwards so that their inner end portions are inserted into a space below the lower side mold member 14, i.e., between the lower side mold member 14 and the lower holder 12, and the inclined surfaces 62 at the inner end portions are brought into surface-contact with the inclined surface 63 of the lower side mold member 14. As a result, the segmented mold 49 comprised the upper and the lower side mold member 21, 14 and the tread mold pieces 47 is held by the upper holder 17, as shown in FIG. 1.

Subsequently, the connecting rod 72a and the displacer element 72 of the lock mechanism 67 are moved downwards by the auxiliary cylinder device, and the connecting rod 72a and the displacer element 72 of the lock mechanism 74 are moved upwards by the auxiliary cylinder device, so that the lock mechanisms 67, 74 are unlocked. Then, the upper and lower clamp rings 66, 69 are removed from the center post 65 and the support columns 64, respectively, and the lower side mold member 14 is also removed from the lower holder 12. The upper and lower clamp rings 66, 69 are thus released from the respective lock mechanisms 67, 74, though the upper clamp ring 66 is held by the upper side mold member 21 due to the attraction force of the magnet 75, and the lower clamp ring 69 is similarly held by the lower side mold member 14 due to the attraction force of the magnet 76. Therefore, it is possible which prevents relative dislocation between the upper and lower clamp rings 66, 69.

The upper holder 17 is then moved upwards together with the top plate 20 and the upper side mold member 21, which are collectively clamped by the clamp device 38, the tread mold pieces 47 which are supported in their radially innermost positions by the top plate 20, as well as the lower side mold member 14 which are supported from below by the support elements 61. On this occasion, the top plate 20, the upper side mold member 21, the tread mold pieces 47 and the lower side mold member 14 are held by the upper holder 17 as being combined with each other, and moved to a predetermined position together with the upper and lower clamp rings 66, 69 and the bladder 71. During such movement, the upper and lower clamp ring 66, 69 are held by the upper and lower side mold members 21, 14 due to the attraction force of the magnets 75, 76, respectively. Therefore, the upper and lower clamp rings 66, 69 are prevented from undergoing a relative dislocation even when acted by external force, thereby avoiding undesirable deformation of the bladder 71.

Figure 4:
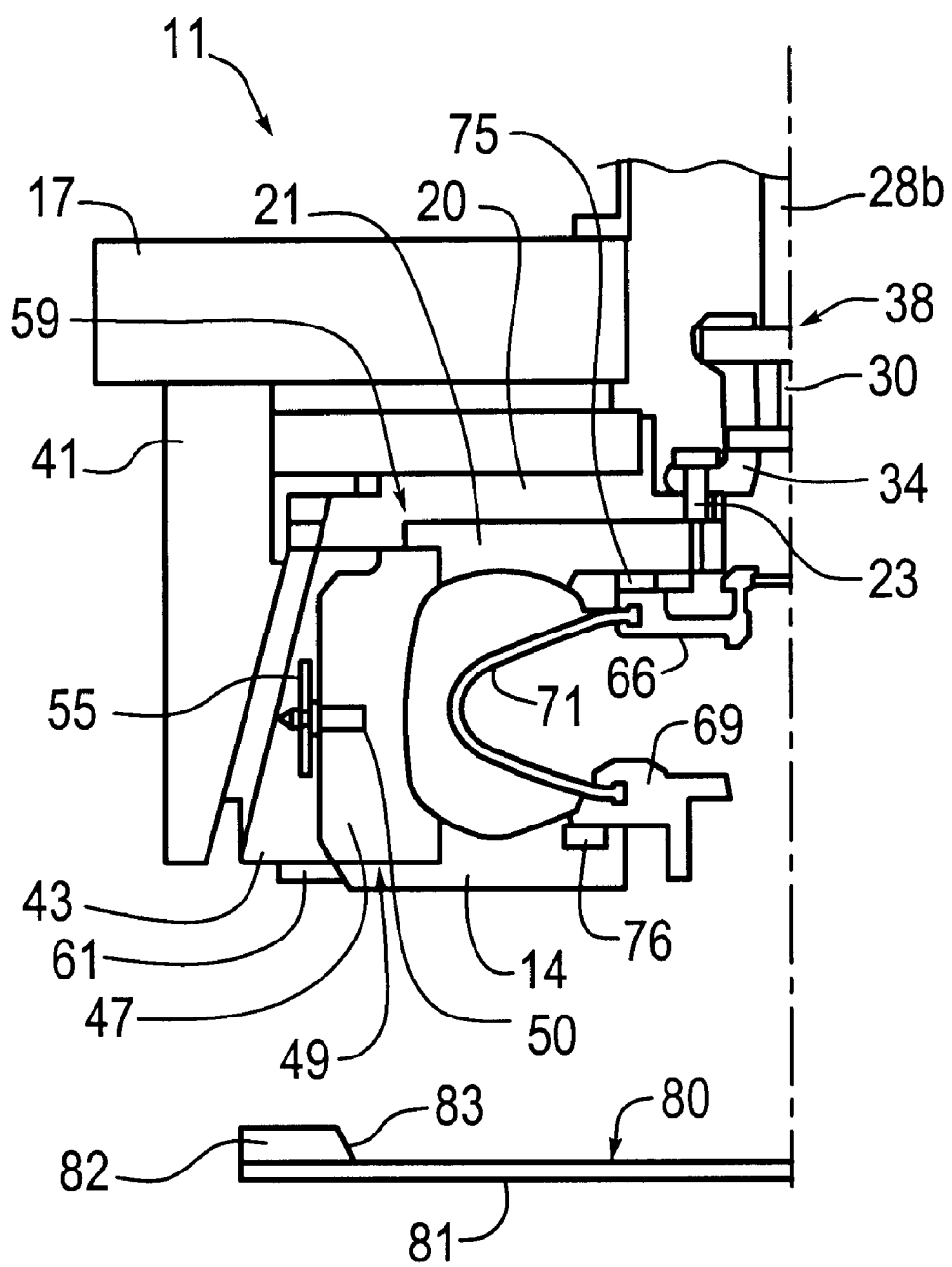
FIG. 4 is a sectional view showing an initial stage of exchanging the segmented mold.
Figure 5:
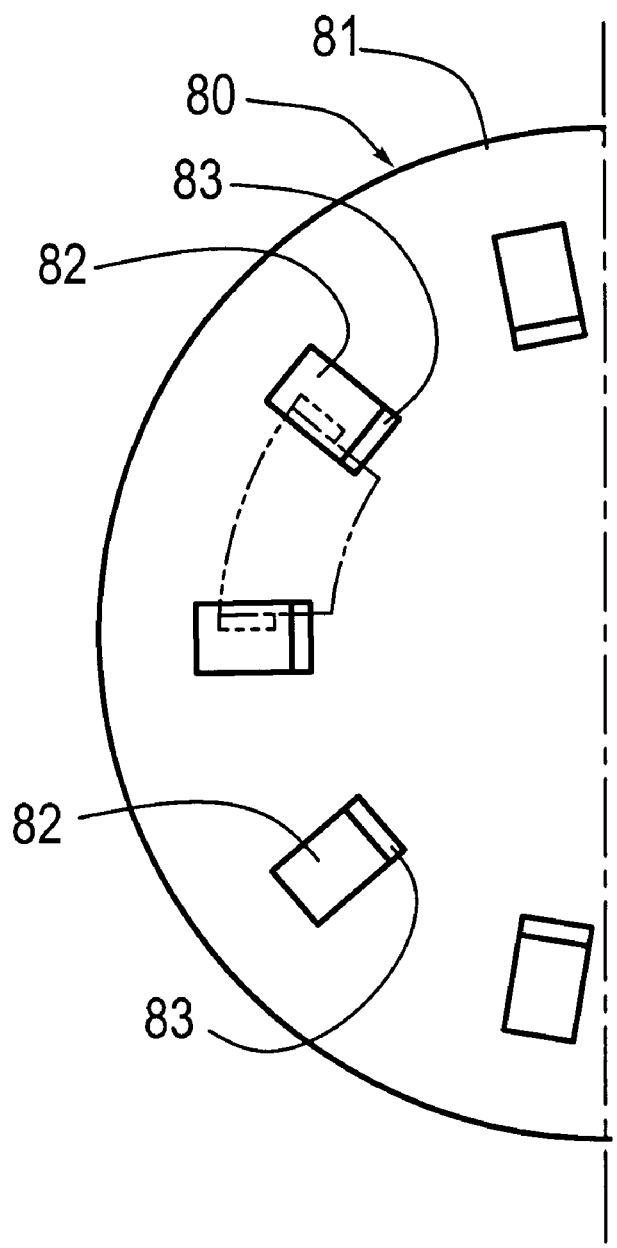
FIG. 5 is a plan view of a table.

A horizontal table 80 as shown in FIGS. 4 and 5 is then transferred to a position below the segmented mold 49 which has been moved upwards as explained above. The table 80 comprises a horizontal disk-shaped base member 81, and protrusions 82 which are identical in number with the tread mold pieces 47, and integrally provided on the upper surface of the base member 81. The protrusions 82 are spaced from each other in the circumferential direction at regular intervals, and each has an inclined surface 83 at its radially inner end, which is adapted to engage with the outer peripheral portion of the corresponding tread mold piece 47.

The upper holder 17 is then moved downwards so that the segmented mold 49 comprised of the upper and lower side mold member 21, 14 and the tread mold pieces 47 is placed onto the upper surface of the table 80. On this occasion, the lower surfaces of the slide plates 54 are brought into abutment with the protrusions 82 so that the slide plates 54, the latch elements 55 and the guide rods 56 are collectively pushed upwards thereby disengaging the lock pins 50 from the latch elements 55. By simply placing the segmented mold 49 onto the table 80, the lock pins 50 are automatically disengaged from the latch elements 55 and can be radially moved relative to the connector segment 43 so that the connector segments 43 are disconnected from the respective the tread mold pieces 47 in a facilitated manner.

Figure 6:
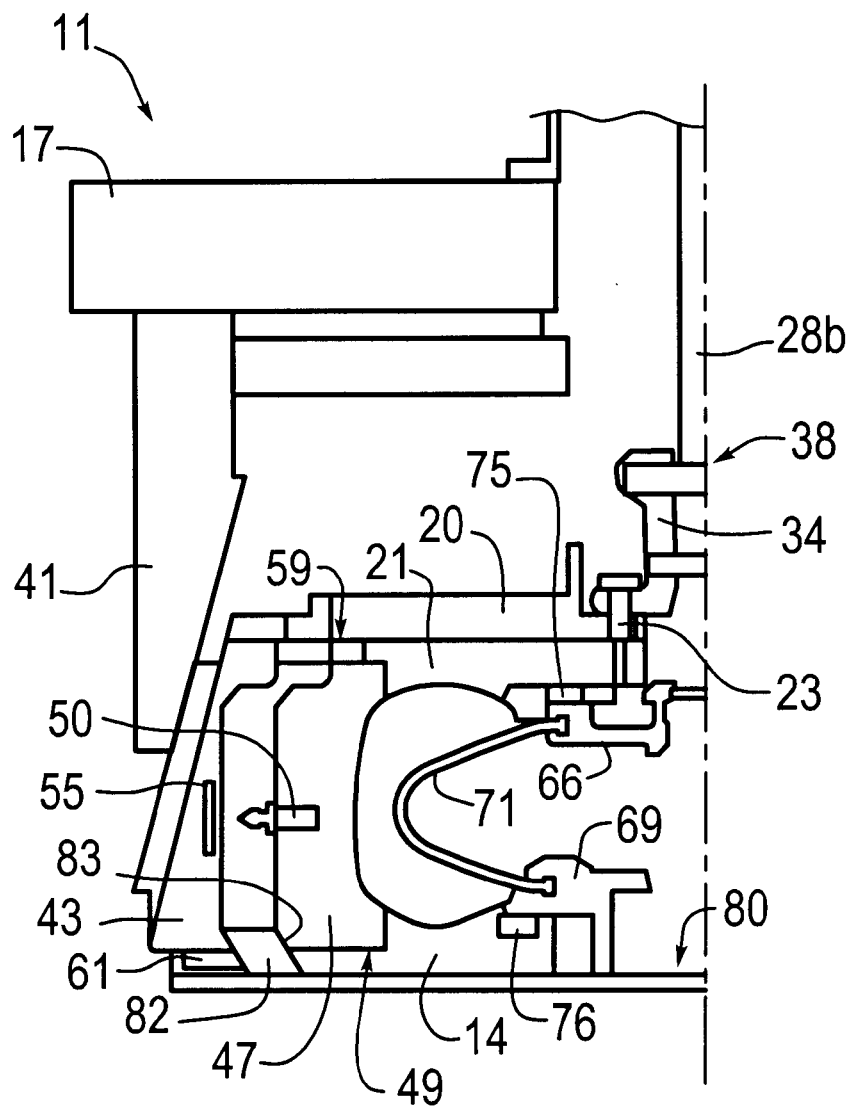
FIGS. 6 and 7 are sectional views showing successive stages of exchanging the segmented mold.
Figure 7:
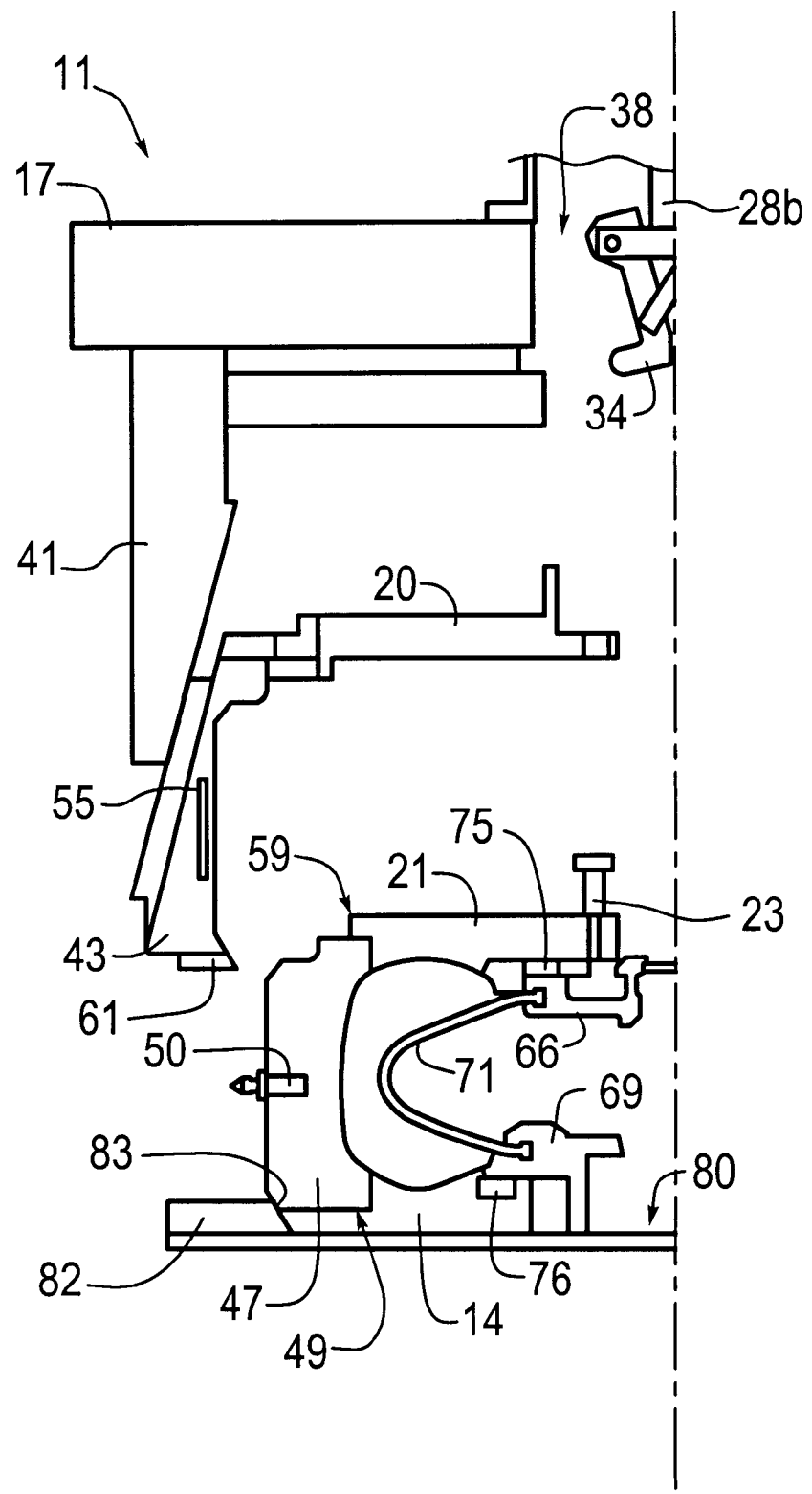

The upper holder 17 is then moved upwards to that the upper holder 17 and the container ring 41 are separated from the lower holder 12. Simultaneously, the lower piston rod 28b of the cylinder device 27 is extended downward so that the upper side mold member 21 is maintained in tight contact with the segmented mold 49. Thus, due to the sliding engagement between the inclined surfaces 42, 44 of the container ring 41 and the connector segments 43, the connector segments 43 are synchronously moved radially outwards. On this occasion, the lock pins 50 are removed in the radial direction from the connector segments 43 so that the connector segments 43 are disconnected from the respective tread mold pieces 47, and the support elements 61 are moved radially outwards from the respective positions below the lower side mold member 14, as shown in FIG. 6.

Subsequently, the piston 30 is retracted by operating the auxiliary cylinder device 29, so that the line elements 35 are caused to swing about the pivot 36. The bottom end portions of the clamp levers 34 are thereby moved radially inwards and disengaged from the gap between the upper surface of the top plate 20 and the bottom surfaces of the shoulders 24a of the lock pins 23. The top plate 20 and the upper side mold member 21 are thus released from the clamping engagement by the clamp device 38, and removed from the cylinder device 27. Therefore, the segmented mold 49 in which the upper and lower side mold members 21, 14 and the tread mold pieces 47 are connected to each other is released from the upper holder 17.

The upper holder 17 is further moved upwards so that the container ring 41, the top plate 20 and the connector segment 43 are moved upwards together with the upper holder 17, away from the segmented mold 49. On the other hand, the segmented mold 49, the upper and lower clamp rings 66, 69 and the bladder 71, which have been completely separated from the upper holder 17, are left on the table 80 in the combined condition. The table 80 is removed from the vulcanizing machine 11, supporting thereon the segmented mold 49 as well as the upper and lower clamp rings 66, 69 and the bladder 71. During such removal of the segmented mold, the inclined surfaces 83 of the protrusions 82 are in engagement with the outer peripheral portions of the tread mold pieces 47 so as to prevent dislocation or tilting of the tread mold pieces 47.

2. Installation of New Segmented Mold

A next stage for exchanging the segmented mold of the vulcanizing machine 11 is to install a new set of segmented mold 49 which corresponds to tires of a new size or specification. The new set of segmented mold 49 is also comprised of upper and lower side mold member 21, 14 and tread mold pieces 47, and combined with upper and lower clamp rings 66, 69 and bladder 71. The segmented mold 49 and the associated components, which are assembled with each other, are transferred to the exchange position as being supported on the table 80. On this occasion, the upper and lower clamp rings 66, 69 are held by the attraction force of the magnets 75, 76 of the upper and lower side mold members 21, 14, respectively, thereby preventing dislocation between the upper and lower clamp rings 66, 69 in the manner explained above. The new set of segmented mold 49 is exchanged with the previous set of segmented mold 49 at the exchange position.

The upper holder 17 is then moved downwards to the position shown in FIG. 6, and the lower piston rod 28b of the cylinder device 27 is extended downwards to the position also shown in FIG. 6. The piston rod 30 of the auxiliary cylinder device 29 is then extended to cause swinging motion of the link elements 35 about the pivot 36 so that the bottom end portions of the clamp levers 34 are moved radially outwards and pushed into the space between the upper surface of the top plate 20 and the shoulder 24a of the lock pins 23. As a result, the top plate 20 and the upper side mold members 21 are collectively clamped at the inner peripheries by the clamp device 38, with the top plate 20 urged against the upper side mold member 21. By this, the top plate 20 and the upper side mold member 21 are connected to the cylinder device 27 through the clamp device 38.

Subsequently, the upper holder 17 and the container ring 41 are moved downwards. At that time, the lower piston rod 28b of the cylinder device 27 is retracted upward so that the lower holder 12 is held at a position where it is in tight contact with the segmented mold 49. When the upper holder 17 and the container ring 41 have been moved downwards, the connector segments 43 are synchronously moved radially inwards due to the sliding engagement between inclined surfaces 42, 44. As a result, the lock pins 50 of the tread mold pieces 47 are inserted into the connector segment 43 and engaged with the respective latch elements 55. On this occasion, the conical head 51 of each lock pin 50 pushes the relevant slide plates 54 upwards until the head 51 has passed through recess 58. The latch element 55 then undergoes a downward movement and is thus brought into abutment with the shaft 52 due to the gravity or under a resilient biasing force, and thereby engaged with the shoulder portion 53. In this way, the tread mold pieces 47 can be connected to the respective connector segments 43 in a facilitated manner.

The above-mentioned radially inward movement of the connector segments 43 causes the radially inner ends of the support elements 61 to be inserted below the lower side mold member 14. Thus, the lower side mold member 14 is supported from its bottom surface by the support elements 61, and the upper and lower side mold members 21, 14 and the tread mold pieces 47, which have been transferred to the exchange position, is held by the upper holder 17 as being combined with each other.

The upper holder 71 is then moved upwards so that the upper and lower side mold members 21, 14, the tread mold pieces 47, the upper and lower clamp rings 66, 69 and the bladder 71 are collectively moved upwards and lifted from the table 80. The table 80 is removed from the vulcanizing machine 11, and the upper holder 17 is then moved downwards. As a result, the upper and lower side mold members 21, 14 and the tread mold pieces 47, which are combined with each other and supported by the support elements 61, are placed on the lower holder 12.

Subsequently, the connecting rods 72a and the displacer member 72 of the lock mechanisms 67, 74 are moved upwards and downwards, respectively, thereby causing the upper and the lower clamp rings 66, 69 to be connected to the center post 65 and the support column 64, respectively. The support column 64 is then moved downwards so that the lower side mold member 14 is urged by the lower clamp ring 69 against the lower holder 12. The segmented mold 40 is now installed into the vulcanizing machine 11.

During the exchange of the segmented mold 49, the upper and lower holders 17, 12 which are heavy weighted are left on the vulcanizing machine 11, so that the transfer of the segmented mold 49 can be performed in a facilitated manner. Then, the upper holder 17 is moved upwards so that an unvulcanized tire can be accommodated in the segmented mold 49. When vulcanization of the tire is performed, a heat medium under high temperature and high pressure conditions is introduced into the bladder 71 so that the tire is urged against the inner surface of the segmented mold 49 to define the outer contour of the tire in its tread portion and sidewall portions. The support columns 64 and the center post 65 are left on the vulcanizing machine 11 during exchange of the segmented mold 49, so that the mold 49 is transferred together with the lower and upper clamp ring 69, 66 which have been removed from the support column 64 and the center post 65. It is therefore unnecessary to divide and connect the center post or remove and connect the support column of a divided structure upon exchange of the mold, as was the case in the prior art, and it is thus possible according to the present invention to significantly improve the work efficiency of the mold exchange and the manufacturing productivity of tires. Moreover, the vulcanizing machine according to the present invention requires only one set of support column 64 and center post 65, which facilitates the handling and reduces the total cost of equipment.

Figure 8:
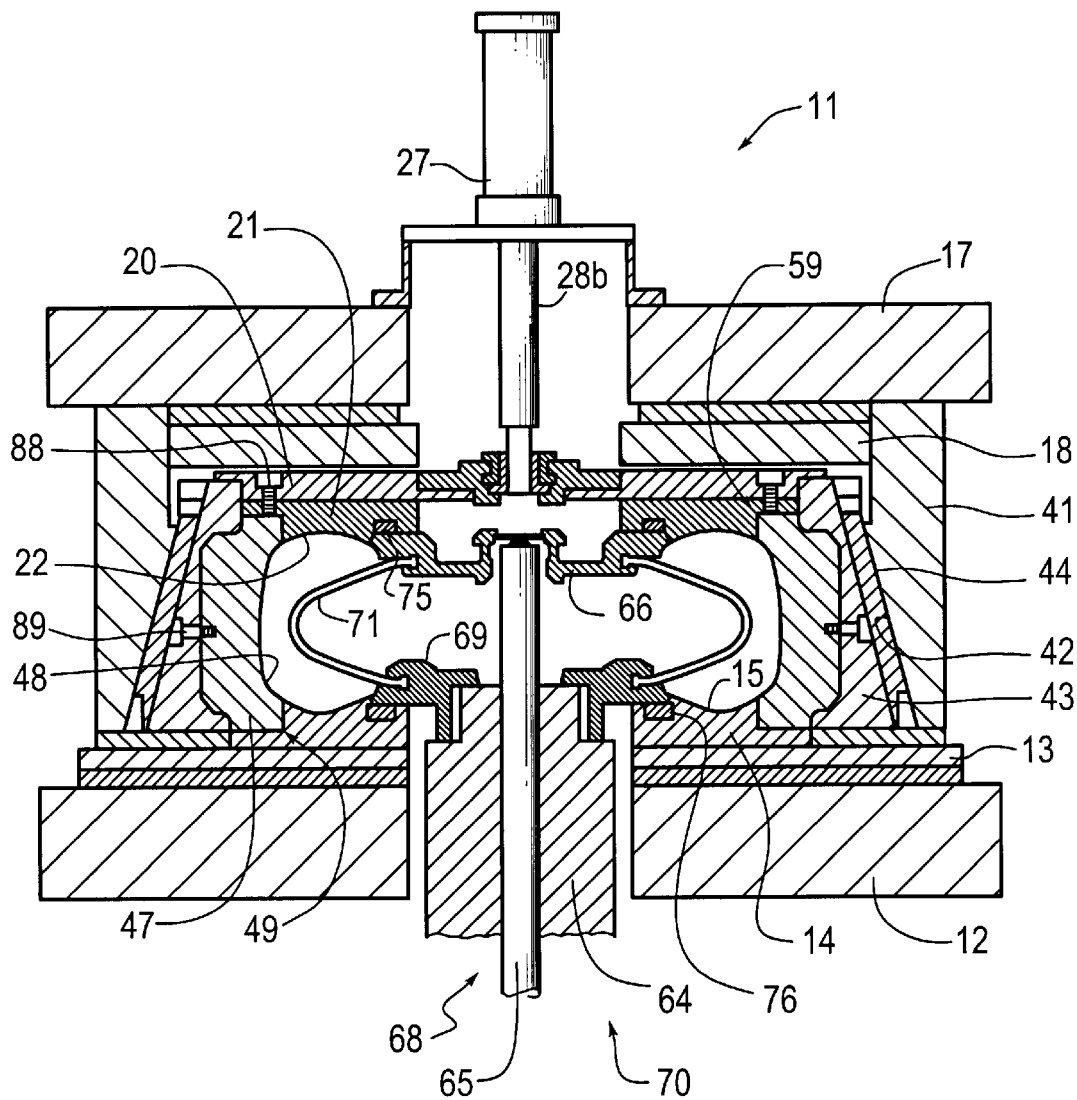
FIGS. 8, 9 and 10 are sectional view showing the vulcanizing machined according to the modified embodiments of the present invention.

A modified embodiment is shown in FIG. 8, wherein the cylinder device 27 is of a simple-rod type. The top plate 20 is detachably attached to the free end of the piston rod of the cylinder device 27, the upper side mold member 21 is detachably attached to the top plate 20 through bolts 88, and the tread mold pieces 47 are detachably attached to the connector segments 43 by bolts 89, respectively. According to the embodiment of FIG. 8, the auxiliary cylinder device 29, the clamp device 38, the lock pins 50, the slide plate 54, and the latch elements 55, which are provided in the previous embodiment, are omitted.

In the embodiment of FIG. 8, when exchanging the segmented mold 49, the top plate 20 is removed from the piston rod of the cylinder device 27, the upper holder 17 is then moved upwards to a position shown in FIG. 6, and the tread mold pieces 47 are separated from the connector segments 43 by removing the bolts 89. Then, the upper holder 17 is further moved upwards, and the upper side mold member 21 is separated from the top plate 20 by removing the bolts 88. On this occasion, the upper and lower clamp rings 66, 69 are removed from the center post 65 and the support column 64, though they are held on the upper and lower side mold member 21, 14 due to attraction force of the magnets 75, 76, as is the case with the previous embodiment. Next, the upper and lower side mold members 21, 14, the tread mold pieces 47, the upper and lower clamp rings 66, 69, the bladder 71 and the like are transferred from the vulcanizing machine 11 by a carriage, not shown, and a new segmented mold to be used for producing tires of a different size or specification is transferred into the machine 11. During such transfer of the segmented mold, the magnets 75, 76 hold the upper and lower clamp rings 66, 69 as mentioned above, thereby preventing dislocation or rotation of the clamp rings 66, 69.

Thereafter, by carrying out the above-mentioned step in a reversed order, the upper and lower side mold member s21, 14 and the tread mold pieces 47 are installed into the vulcanizing machine 11, and the upper and the lower clamp rings 66, 69 are connected to the center post 65 and the supporting column 64, respectively. Otherwise, the embodiment of FIG. 8 is essentially the same as the previous embodiment in terms of structure and function. According to the present invention, it is also possible to carry out the exchange of the segmented mold by simultaneously transferring the upper and lower holders 17, 12, the container ring 41 and the connector segments 43 with reference to the vulcanizing machine 11, in addition to the segmented mold 49, the upper and lower clamp rings 66, 69 and the bladder 71, so that they are disassembled or assembled at a location outside of the machine 11.

Figure 9:
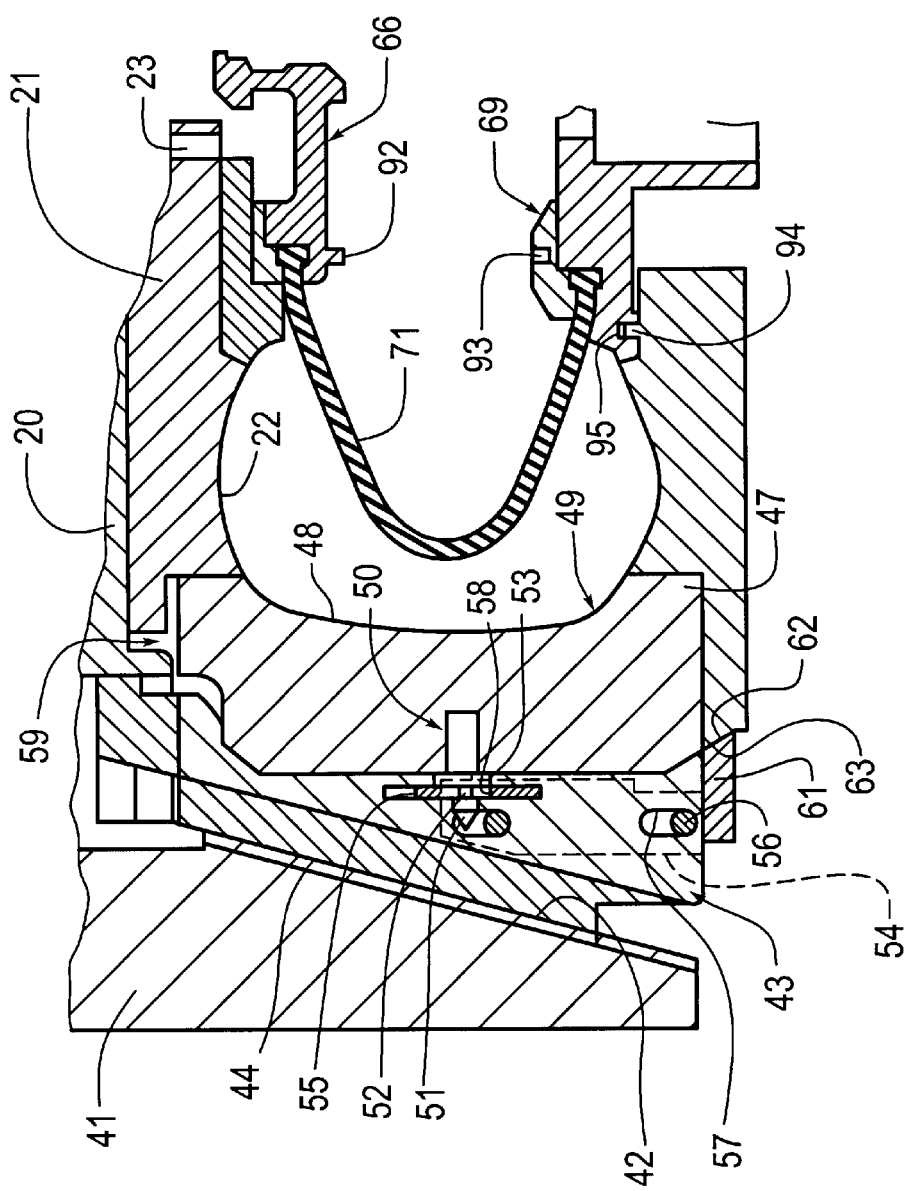

Another modified embodiment of the present invention is shown in FIG. 9, wherein the magnets 75, 76 are omitted and a plurality of positioning pins 92 are disposed on the lower surface of the upper clamp ring 66 to protrude downwards therefrom, and a plurality of holes 93 are formed in the upper surface of the lower clamp ring 69. The holes 93 are aligned with the respective positioning pins 92, so that the positioning pins 92 can be inserted into the holes 93. Furthermore, a plurality of auxiliary pins 94 are disposed on the upper surface of the lower side mold member 14 opposed to the lower surface of the lower clamp ring 69, and auxiliary holes 95 are disposed on axial lines of the auxiliary pins on the under face of the lower clamp ring 69. In this instance, the auxiliary pins 94 are usually received in the auxiliary holes 95. The provision of the above-mentioned pins 92, 94 and the holes 93, 95 serves to positively prevent dislocation of the lower clamp ring 69 and the lower side mold member 14.

When the segmented mold 49 is transferred from the vulcanizing machine 11 together with the upper and lower clamp rings 66, 69 and the bladder 71, the center post 65 is moved downwards so that the upper clamp ring 66, which had been in abutment with the upper side mold member 21, is brought into abutment with the lower clamp ring 69 and the positioning pins 92 are inserted into the respective holes 93. Then, by actuating the lock mechanisms 67, 74, the upper and the lower clamp rings 66, 69 are removed from the center post 65 and the support columns 64, respectively. The segmented mold 49 is then removed from the vulcanizing machine 11 together with the upper and lower clamp rings 66, 69 and the bladder 71. On this occasion, the positioning pins 92 are received in the respective holes 93, thereby preventing dislocation between the upper and lower clamp rings 66, 69.

Then, a new segmented mold 49 for the production of tires of different size or specification is transferred into the vulcanizing machine 11 together with the upper and the lower clamp ring 66, 69 and the vulcanizing bladder 71. At this time also, the positioning pins 92 are received in the respective holes 93, thereby preventing dislocation between the upper and lower clamp rings 66, 69. By actuating the lock mechanisms 67, 74, the upper and the lower clamp rings 66, 69 are connected to the center post 65 and the support column 64, respectively. The center post 65 is then moved upwards so that the upper clamp ring 66 is brought into abutment with the upper side mold member 21.

The arrangement of the positioning pins and the corresponding holes may be reversed. Thus, the holes may be disposed in the lower surface of the upper clamp ring and the positioning pins may be disposed on the upper surface of the lower clamp ring corresponding to the lower surface of the upper clamp ring. Alternatively, both the positioning pins and the holes may be provided for the lower surface of the upper clamp ring, and also for the upper surface of the lower clamp ring. Otherwise, the embodiment of FIG. 9 is essentially the same as the previous embodiments in terms of structure and function.

Figure 10:
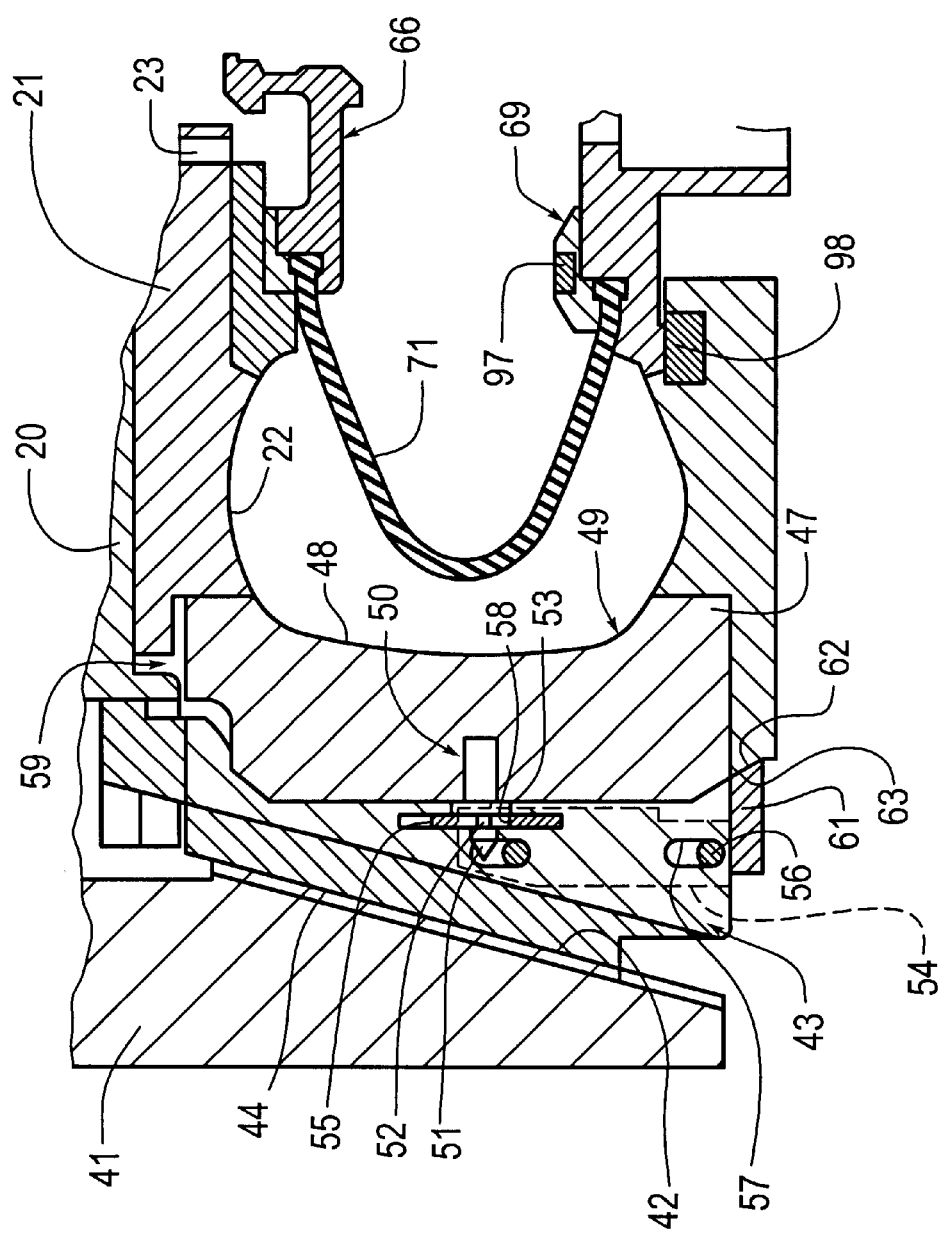

Still another modified embodiment of the present invention is shown in FIG. 10, wherein the lower clamp ring 69 is provided with permanent magnets 97 on its upper surface opposite to the lower surface of the upper clamp ring 66. The attraction force of the magnets 97 serves to hold the upper clamp ring 66 on the lower clamp ring 69, thereby preventing dislocation between the upper and the lower clamp rings 66, 69. Furthermore, a plurality of auxiliary magnets 98 are embedded in the upper surface of the lower side mold member 14 corresponding to the lower surface of the lower clamp ring 69. The attraction force of the auxiliary magnets 98 serves to causes the lower clamp ring 69 to be held on the lower side mold member 14, thereby preventing dislocation therebetween.

When the segmented mold 49 is removed from the vulcanizing machine 11 together with the upper and lower clamp rings 66, 69 and the bladder 71, the center post 65 is moved downwards so that the upper clamp ring 66, which had been in abutment with the upper side mold member 21, is moved downwards and brought into abutment with the lower clamp ring 69. The attraction force of the magnets 97 serves to hold the upper clamp ring 66 on the lower clamp ring 69. The lock mechanisms 67, 74 are then actuated so that the upper and lower clamp rings 66, 69 are removed from the center post 65 and the support column 64, respectively. Subsequently, the segmented mold 49 is removed from the vulcanizing machine 11 together with the upper and lower clamp rings 66, 69 and the bladder 71. On this occasion, the attraction force of the magnets 97 hold the upper clamp ring 66 on the lower clamp ring 69, as mentioned above, so as to prevent dislocation therebetween.

Then, a new segmented mold 49 for the production of tires of different size or specification is transferred into the vulcanizing machine 11 together with the upper and the lower clamp ring 66, 69 and the vulcanizing bladder 71. At this time also, the attraction force of the magnets 97 serves to hold the upper clamp ring 66 on the lower clamp ring 69, thereby preventing dislocation between the upper and lower clamp rings 66, 69. The lock mechanisms 67, 74 are actuated so that the upper and lower clamp rings 66, 69 are connected to the center post 65 and the support column 64, respectively. The center post 65 is then moved upwards so that the upper and lower clamp rings 66, 69 are brought into abutment with the upper side mold member 21.

The arrangement of the magnets may be reversed; thus, the magnets may be provided for the lower surface of the upper clamp ring. Alternatively, the magnets may be provided for both the lower surface of the upper clamp ring and the upper surface of the lower clamp ring. Otherwise, the embodiment of FIG. 10 is essentially the same as the previous embodiments in terms of structure and function.

It will be appreciated from the foregoing detailed description that, according to the present invention, it is possible to highly efficiently exchange the segmented mold while facilitating the handling and reducing the cost of facility. The exchangeable segmented mold can be installed into the vulcanizing machine or removed therefrom in a facilitated manner. As a result, it is possible to readily perform the changeover in size or specification of the tires to be produced by the vulcanizing machine and thereby achieving a marked improvement in the manufacturing productivity.

While the present invention has been described with reference to specific embodiments, they were presented by way of examples only, and various changes may be made without departing from the scope of the invention as defined by the appended claims.

For example, in the above-mentioned embodiments, the upper holder is moved upwards so that a new segmented mold with their components assembled with each other is lifted or moved upwards and transferred to the exchange position (or table 80) between the upper and lower holders 17, 12, in order to exchange the previous segmented mold to the new segmented molds at the exchange position. However, it is also possible to combine the upward movement of the upper holder with a traversing movement such that the segmented mold is transferred to the exchange position which is spaced from the vulcanizing machine, in order to exchange the previous segmented mold to the new segmented molds at the exchange position.

Furthermore, in the above-mentioned embodiments, the segmented mold is comprised of three kinds of mold members, i.e., the upper and lower side mold members and the tread mold pieces. However, the mold may be of a tow-piece structure comprising an upper mold member for defining the outer contour of tires above the tread center, and a lower mold member for defining the outer contour below the tread center.

Moreover, according to the present invention, the segmented mold may be transferred into, or removed from the vulcanizing machine together with the corresponding bladder, so that the exchange of the segmented mold is performed simultaneously with the exchange of the bladder.

What is claimed is:

1. A method of exchanging a segmented mold of a vulcanizing machine for producing pneumatic tires, wherein the segmented mold comprises a plurality of tread mold pieces for defining an outer contour of a tire tread portion, said tread mold pieces each having an outer peripheral surface, and upper and lower side mold members engaged with said tread mold pieces, for defining outer contours of respective tire sidewall portions, and wherein said vulcanizing machine further comprises a plurality of connector segments detachably connected to said outer peripheral surfaces of the respective tread mold pieces, said connector segments each having a tapered portion on back sides thereof, a container ring having a tapered surface slidably engaged with said tapered portions of the connector segments such that a vertical movement of the container ring in the axial direction of the machine causes a radial movement of said connector segments relative to said tread mold pieces, and a top plate detachably connected to said upper side mold member, said method comprising the steps of:

removing a first segmented mold for tires of a first size, which is comprised of first tread mold pieces, a first upper side mold member and a first lower side mold member, from the machine in its non-operative condition, by disconnecting said connector segments from the respective first tread mold piece while moving the container ring upwards so that the connector segments are moved radially outwards and disconnected from the respective first tread mold pieces, and disconnecting said top plate from the first upper side mold member; and installing into the machine a second segmented mold for tires of a second size, which is comprised of second tread mold pieces, a second upper side mold member and a second lower side mold member, by placing and centering the second mold with reference to the vulcanizing machine, moving the container ring downwards so that the connector segments are moved radially inwards relative to the second tread mold pieces and are connected to the respective second tread mold pieces, and connecting the top plate to said second upper side mold member.

2. The method according to claim 1, wherein the removal of the first segmented mold and/or installation of the second segmented mold are carried out with respect to said vulcanizing machine which is under a high temperature condition.

3. The method according to claim 1, wherein said upper side mold member is connected to said top plate by simultaneously engaging a single clamping device to a plurality of lock pins which are provided for the upper side mold member and extend upwards through the top plate.

4. The method according to claim 3, wherein said upper side mold member is disconnected from the top plate by simultaneously disengaging the clamping device from the lock pins of the upper side mold member.

5. A vulcanizing machine for producing pneumatic tires, comprising:

upper and lower holders;

upper and lower side mold members for defining outer contours of respective tire sidewall portions, said upper side mold member being detachably connected to said upper holder through a top plate, and said lower side mold member being detachably connected to said lower holder;

a plurality of tread mold pieces for defining an outer contour of a tire tread portion, said tread mold pieces each having an outer peripheral surface and being engaged with said upper and lower side mold members;

a plurality of connector segments detachably connected to said outer peripheral surfaces of the respective tread mold pieces, said connector segments each having a tapered portion on back sides thereof;

a container ring having a tapered surface which is slidably engaged with said tapered portions of the connector segments such that an axial movement of the container ring causes a radial movement of said tread mold pieces;

clamp means for detachably connecting said upper side mold member to said top plate; and actuator means for moving said upper holder toward and away from said upper side mold member together with said top plate connected thereto.

6. The vulcanizing machine according to claim 5, wherein said upper and lower side mold members and said tread mold pieces form an exchangeable unit which can be removed from, or installed on the vulcanizing machine in its non-operative state but under a high temperature condition.

7. The vulcanizing machine according to claim 5, wherein said upper side mold member is provided with a plurality of lock pins which extend upwards through said top plate, and said clamping means is simultaneously engageable with the lock pins.

8. The vulcanizing machine according to claim 7, wherein said top plate has a plurality of through holes at locations corresponding to said lock pins of the upper side mold member, and each of said lock pins has a head which protrudes upwards from the upper surface of the top plate when the top plate is in contact with the upper side mold member, so as to be simultaneously engageable with said clamp means.

9. The vulcanizing machine according to claim 5, wherein said actuator means comprises a double-rod type main cylinder device having a piston rod which supports said clamp means at its one end.

10. The vulcanizing machine according to claim 9, wherein said clamp means comprises clamp elements and an auxiliary cylinder device for actuating said clamp elements, said auxiliary cylinder device including a piston rod which extends through the piston rod of said main cylinder device and which is connected, at another end thereof, to another end of the piston rod of said main cylinder device.

* * * * *